United States Patent
Reich et al.

(10) Patent No.: US 9,176,010 B2
(45) Date of Patent: Nov. 3, 2015

(54) MINIATURIZED THERMOCOUPLE SCANNER SYSTEM

(75) Inventors: Alton Reich, Huntsville, AL (US); James Shaw, Sterling, CT (US)

(73) Assignee: Streamline Automation, LLC, Huntsville, AL (US)

( * ) Notice: Subject to any disclaimer, the term of this patent is extended or adjusted under 35 U.S.C. 154(b) by 339 days.

(21) Appl. No.: 13/819,718

(22) PCT Filed: Aug. 30, 2011

(86) PCT No.: PCT/US2011/049789
§ 371 (c)(1),
(2), (4) Date: Feb. 28, 2013

(87) PCT Pub. No.: WO2012/030861
PCT Pub. Date: Mar. 8, 2012

(65) Prior Publication Data
US 2013/0156070 A1    Jun. 20, 2013

Related U.S. Application Data

(60) Provisional application No. 61/378,455, filed on Aug. 31, 2010.

(51) Int. Cl.
G01K 7/02 (2006.01)
G01K 1/02 (2006.01)
G01K 7/13 (2006.01)

(52) U.S. Cl.
CPC  *G01K 7/02* (2013.01); *G01K 1/026* (2013.01); *G01K 7/021* (2013.01); *G01K 7/13* (2013.01); *G01K 2205/00* (2013.01)

(58) Field of Classification Search
USPC ......................................... 374/179, 166, 170
See application file for complete search history.

(56) References Cited

U.S. PATENT DOCUMENTS

| | | | | |
|---|---|---|---|---|
| 3,272,012 | A * | 9/1966 | Seney | 374/110 |
| 3,911,745 | A * | 10/1975 | Erhardt | 374/181 |
| 4,130,019 | A * | 12/1978 | Nitschke | 374/110 |
| 4,150,433 | A * | 4/1979 | Kaniel | 702/90 |
| 4,718,777 | A * | 1/1988 | Mydynski et al. | 374/181 |
| 5,669,713 | A * | 9/1997 | Schwartz et al. | 374/1 |
| 6,243,634 | B1 * | 6/2001 | Oestreicher et al. | 701/45 |
| 7,994,416 | B2 * | 8/2011 | Schuh | 136/230 |
| 8,608,377 | B2 * | 12/2013 | Conti | 374/179 |
| 8,794,830 | B2 * | 8/2014 | Fang et al. | 374/181 |

(Continued)

FOREIGN PATENT DOCUMENTS

WO    9918496 A1    4/1999

*Primary Examiner* — Mirellys Jagan
(74) *Attorney, Agent, or Firm* — Patent Grove, LLC; Tomas Friend

(57) ABSTRACT

An apparatus and method for measuring, collecting, and processing the temperatures of a number of hot junctions in a thermocouple sensor array simultaneously comprises means for measuring the temperature of one or more reference junctions and means for collecting, processing, storing, and transmitting data collected from an array of thermocouple temperature sensors. The measured temperature(s) of the one or more reference junctions is used to correct the measured voltage in each of a plurality of thermocouple circuits to obtain accurate hot junction temperature measurements. The apparatus and method are particularly useful for collecting and processing temperature data from various locations within engines such as turbine, rocket, and internal combustion engines.

10 Claims, 4 Drawing Sheets

(56) References Cited

U.S. PATENT DOCUMENTS

| | | |
|---|---|---|
| 2002/0147936 A1 | 10/2002 | Wiczer |
| 2003/0072833 A1 | 4/2003 | Olaru |
| 2003/0079365 A1 | 5/2003 | Corak |
| 2005/0058178 A1 | 3/2005 | Shih |
| 2006/0067377 A1* | 3/2006 | Streicher ........................ 374/110 |
| 2008/0317087 A1 | 12/2008 | Kimura |
| 2012/0219035 A1* | 8/2012 | Kwon ........................... 374/170 |
| 2014/0269821 A1* | 9/2014 | Egley et al. ..................... 374/54 |

* cited by examiner

MINIATURIZED THERMOCOUPLE SCANNER SYSTEM

FEDERALLY SPONSORED RESEARCH OR DEVELOPMENT

The U.S. Government has certain rights to this invention pursuant to Contract Numbers FA9101-09-M-0011 and FA9101-10-C-0018 awarded by the United States Air Force.

BACKGROUND OF THE INVENTION

The present invention relates to a method and apparatus for transducing electronic signals from a plurality of analog thermocouple sensors into digital output. The apparatus and method provide for accurate temperature measurement simultaneously from an array of thermocouple sensors and thermal sensor data collection, processing, transmission, and storage. The thermocouple sensors may be attached to an object or substrate to obtain real time temperature measurements with data acquisition rates of 50 per second or more, 100 per second or more, 200 per second or higher.

Thermocouples are commonly used for industrial temperature measurement applications. A typical thermocouple consists of a pair of wires that are made of dissimilar metals and are joined at one end. Thermocouples operate based on a principle that, when the ends of two dissimilar metals are joined and the junction is heated, a current flows in the wire loop. If the circuit is broken, an electromotive force (EMF) measured as a voltage, develops in a heated pair of dissimilar metal wires joined at a junction (hot junction). The EMF produced at a thermocouple junction may be measured by a voltmeter, which introduces a reference junction into the circuit containing the hot junction. The net EMF measured in the complete circuit, therefore, depends upon the temperature at the hot junction Tj as well as the temperature of the reference junction Tr. Consequently, the accuracy of the measured temperature at the hot junction Tj can be improved when the temperature of the reference junction is known and used to correct the EMF measured for the complete circuit. This may be accomplished by placing the reference junction into an environment having a known, preferably fixed, temperature. Controlling the temperature of the reference junction, however, is not practical for many applications. The present invention provides a temperature sensor array in which the temperature of one or more reference junctions is measured and the measured temperature is used to improve the accuracy of measured thermocouple temperatures. This eliminated the need for placing the reference junction into an environment having a known and/or fixed temperature.

BRIEF SUMMARY OF THE INVENTION

The present invention is an apparatus and method for measuring, collecting, and processing the temperature of a number of hot junctions in a thermocouple sensor array. The apparatus comprises means for measuring the temperature of one or more reference junctions and means for collecting, processing, storing, and transmitting data collected from an array of thermocouple temperature sensors. The measured temperature(s) of the one or more reference junctions is used to correct the measured voltage in each of a plurality of thermocouple circuits to obtain accurate hot junction temperature measurements, Tj. The apparatus and method are useful for simultaneously measuring temperatures at multiple locations and particularly useful for collecting and processing temperature data from various locations within engines such as turbine, rocket, and internal combustion engines.

DETAILED DESCRIPTION OF THE INVENTION

Figure 1:
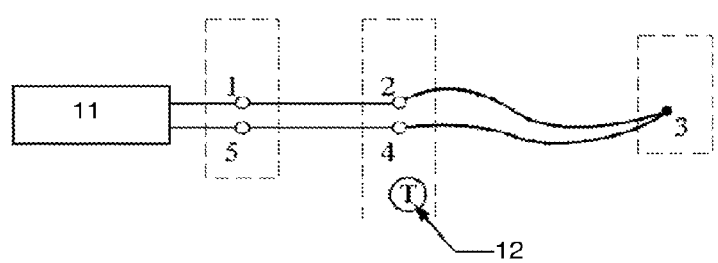
FIG. 1 is a diagram of a prior art circuit used to compensate for reference junction temperature in order to improve the accuracy of hot junction temperature measurement.

FIG. 1 shows a circuit used to account for reference junction temperature during the measurement of a hot junction (3) temperature in a thermocouple sensor. The EMF of the circuit, Erj, is measured using the voltmeter (11) at points 1 and 5. The reference junction (2,4) temperature Tr is measured independently (12) using temperature measuring means such as an ice-point compensated thermocouple, a thermistor, resistance temperature detector (RTD) or a solid-state temperature sensor. The reference junction EMF, E0r, is determined based on Tr. A corrected hot junction EMF, E0j, is calculated, for example, by using the formula E0j=Erj+E0r. The temperature of the hot junction is then determined based on the corrected hot junction EMF, E0j, using a look-up table or equation. The National Institute of Standards and Testing (NIST) has developed tables and curve-fit equations that enable conversion between measured voltage (EMF) and temperature. The table below shows the equations and coefficients required to make these conversions for B-type thermocouples, which are used for high temperature applications.

a. Coefficients to compute the temperature of a B-type thermocouple junction based on the measured (corrected) EMF (voltage)

$$t_{90} = d_0 + d_1 E + d_2 E^2 + \ldots d_n E^n$$

| | Coefficients for voltage range 0.291 mV to 2.431 mV (Temperature range 250° C. to 700° C.) | Coefficients for voltage range 2.431 mV to 13.820 mV (Temperature range 700° C. to 1820° C.) |
|---|---|---|
| $d_0 =$ | 9.8423321E+01 | 2.1315071E+02 |
| $d_1 =$ | 6.9971500E+02 | 2.8510504E+02 |
| $d_2 =$ | −8.4765304E+02 | −5.2742887E+01 |
| $d_3 =$ | 1.0052644E+03 | 9.9160804E+00 |
| $d_4 =$ | −8.3345952E+02 | −1.2965303E+00 |
| $d_5 =$ | 4.5508542E+02 | 1.1195870E−01 |
| $d_6 =$ | −1.5523037E+02 | −6.0625199E−03 |
| $d_7 =$ | 2.9886750E+01 | 1.8661696E−04 |
| $d_8 =$ | −2.4742860E+00 | −2.4878585E−06 | b. Coefficients to compute the EMF (voltage) generated by a B-type thermocouple based on the junction temperature.

$$E = \sum_{i=0}^{n} c_i (t_{90})^i$$

| | Coefficients for temperature range 0.0° C. to 630.615° C. | Coefficients for temperature range 630.615° C. to 1820° C. |
|---|---|---|
| $C_0 =$ | 0.000000000000E+00 | −0.389381686210E+01 |
| $C_1 =$ | −0.246508183460E−03 | 0.285717474700E−01 |
| $C_2 =$ | 0.590404211710E−05 | −0.848851047850E−04 |
| $C_3 =$ | −0.132579316360E−08 | 0.157852801640E−06 |
| $C_4 =$ | 0.156682919010E−11 | −0.168353448640E−09 |

-continued

| | | |
|---|---|---|
| $C_5 =$ | −0.169445292400E−14 | 0.111097940130E−12 |
| $C_6 =$ | 0.629903470940E−18 | −0.445154310330E−16 |
| $C_7 =$ | | 0.989756408210E−20 |
| $C_8 =$ | | −0.937913302890E−24 |

The NIST ITS-90 database has coefficients for all common thermocouple types, and coefficients can be generated for any other custom designed thermocouple.

Figure 2:
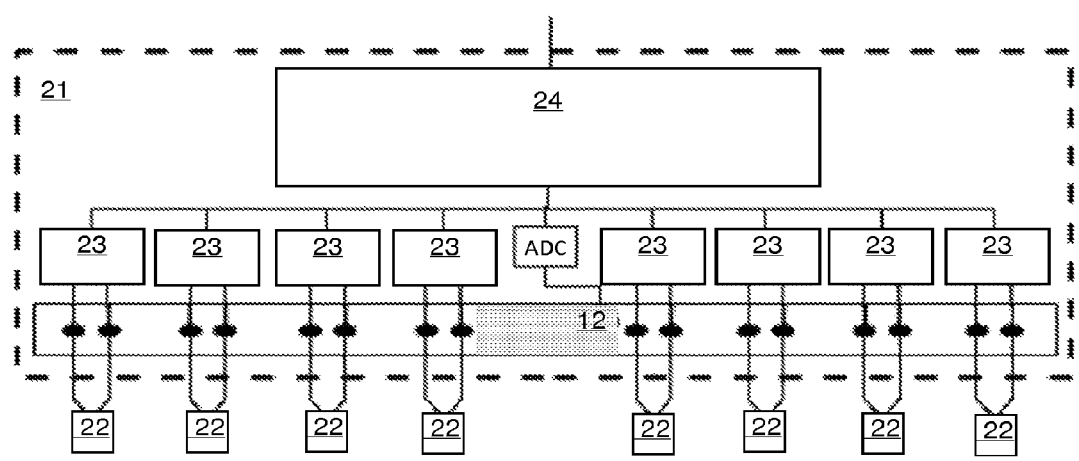
FIG. 2 is a diagram showing a Smart Transducer Interface Module (STIM) interfaced with a number of thermocouple sensors.

An example of a basic data acquisition unit interfaced with a number of thermocouple sensors is shown in FIG. 2. The Smart Transducer Interface Module (STIM) (21) is electrically coupled to the thermocouple(s) (transducer(s)) (22) and converts analog signals from the thermocouples into digital sensor data using analog to digital converters (23). The STIM may be configured to interface with a single or multiple thermocouples (23) (transducers) and stores a local copy of a Transducer Electronic Datasheet (TEDS) for each thermocouple including, for example, a template ID identifying the thermocouple and thermocouple type, calibration information, user specified information, and technical specifications. A STIM processor (24) may comprise a soft "virtual" processor comprising programmable software in a Field Programmable Gate Array (FPGA) or a combination of a physical processor and a FPGA. A soft STIM may be reconfigured to interface with more or fewer thermocouples via changes to software without changes to the hardware. The temperature measurements are triggered to occur simultaneously, or within a window of time that is less than 1000 nanoseconds long, and preferably less than 500 nanoseconds long, and more preferably less than 200 nanoseconds long.

Figure 3:
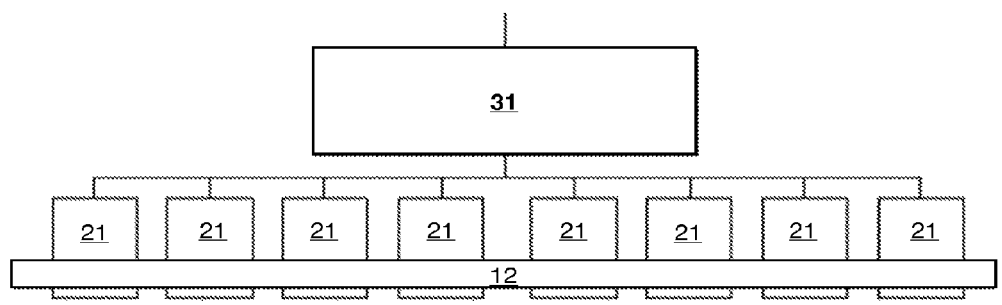
FIG. 3 is a diagram showing a thermocouple data acquisition unit including 8 STIMs connected to a single Network Capable Application Processor (NCAP)

A thermocouple data acquisition unit designed for 64 thermocouples and comprising 8 STIMs (21) is shown in FIG. 3. All of the STIMs may share a common reference junction (12) as shown in the figure or various combinations of STIMs (21) and reference junctions (12) may be used. A single reference junction (12) is preferred to minimize the number of devices used to measure reference junction temperature.

Each of the STIMs is in digital electronic communication with a Network Capable Application Processor (NCAP) (31). The NCAP (31) receives digital data from STIMs (21) that are attached to it, applies a synchronized time stamp, assembles the data into a packet, and transmits data, for example via Ethernet, to a server (41) that receive the data packets, parses them, and stores them in a database. The database may also store local copies of TEDS data from all of the STIMs (21) to enable storage of raw thermocouple data in digitized form and processing of digitized raw data. A NCAP (31) and the STIMs (21) connected to the NCAP (31) are preferably located on the same FPGA board but may be on separate boards. A single board may contain more than one NCAP, with each NCAP being connected to more than one STIM (21). In one embodiment, a FPGA incorporates multiple software-defined processors that perform the functions of the STIM processors (24) and NCAP (31) and the NCAP (31) also functions as an IEEE-1588 client clock.

Figure 4:
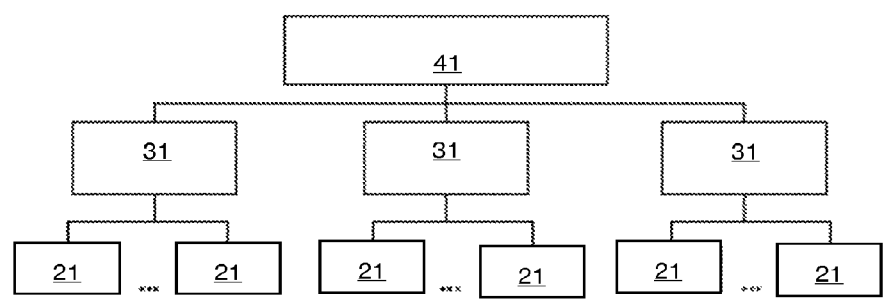
FIG. 4 is a diagram showing multiple NCAPs communicating with a single server.

The server (41) may act as an interface for managing the system and may receive data from multiple NCAPs (31) as shown in FIG. 4. The server (41) is optimally configured to include a discovery that enables the automatic creation of a map of NCAPs (31), STIMs (21), and thermocouples (22) connected to the server (41) with the thermocouple scanner system preferably operating according to LXI Standard (LAN eXtensions for Instrumentation) or IEEE 1451 standards for data collection. The thermocouple scanner system may be integrated with a high speed sensor data transfer interface as described in U.S. application Ser. No. 12/496,471, filed 1 Jul. 2009.

Figure 5:
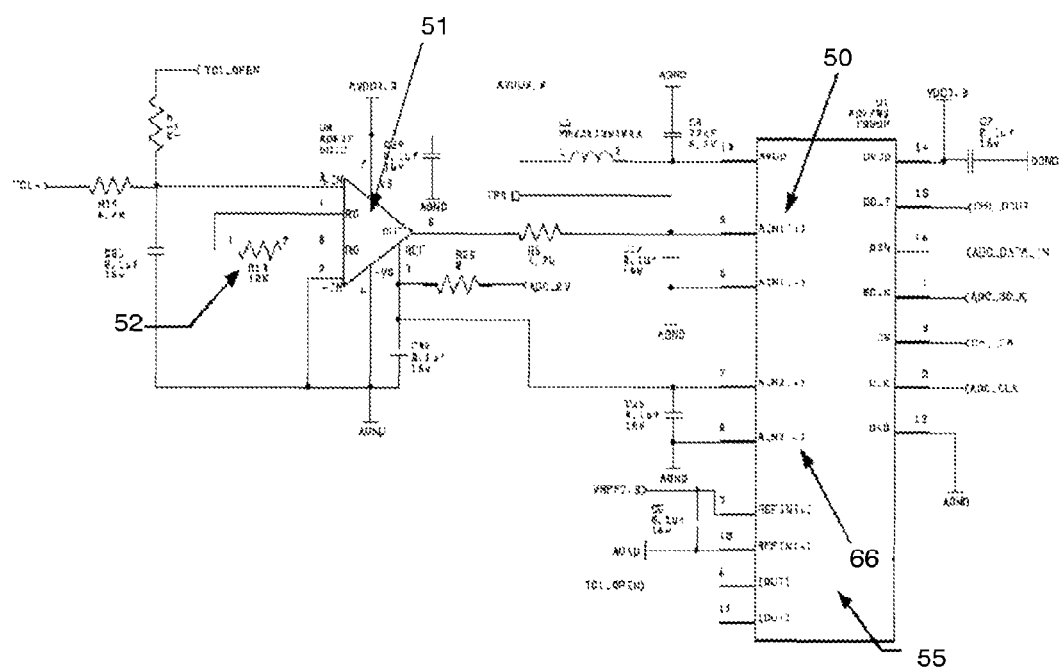
FIG. 5 is a diagram showing a thermocouple interface circuit.

Thermocouple Interface Circuit:

A STIM circuit may, for example, comprise a low power, low noise, 24-bit Σ-Δ analog to digital converter with three differential analog inputs. The output data rate may be software-programmable and varied from 4.17 Hz to 470 Hz. An exemplary thermocouple interface circuit is shown in FIG. 5. In this example, the thermocouple voltage is routed to the +IN pin (50) of the instrumentation amplifier (51), a gain of 25 is applied as determined by the resistor (52) between the RG pins of the instrumentation amp, the amplified signal is offset by the voltage on the reference pin, the output voltage is digitized by AIN1 of the 24-bit ADC (55), and the offset reference voltage is digitized by AIN2.

Figure 6:
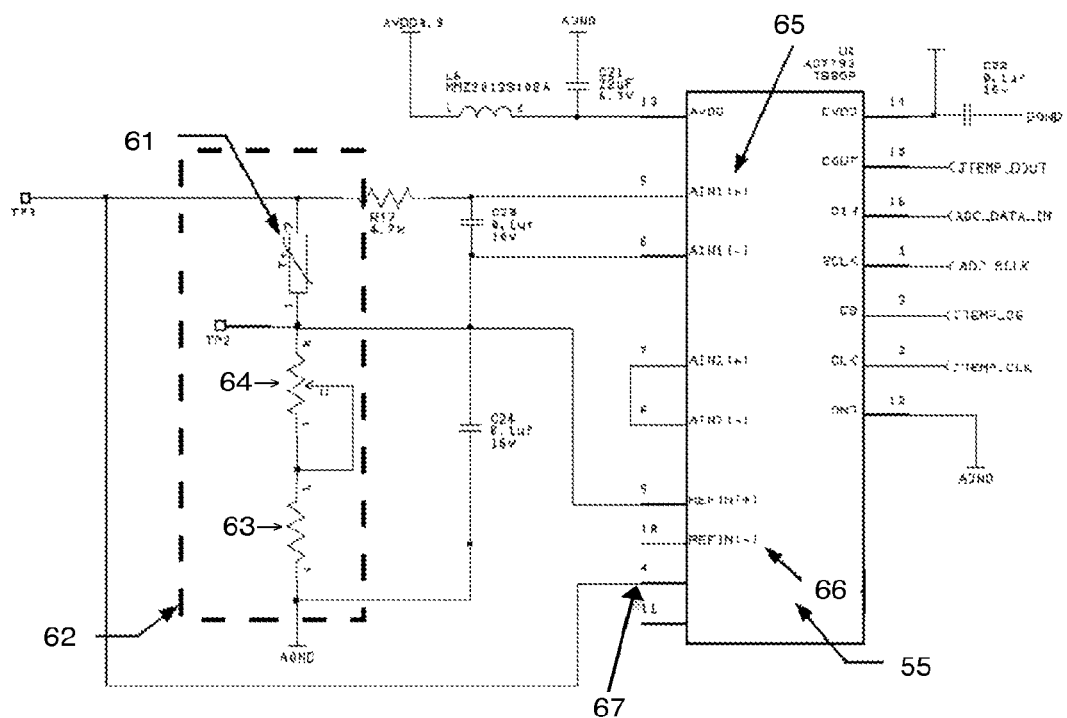
FIG. 6 is a diagram showing a reference junction temperature measurement circuit.

Reference Junction Temperature Measurement Circuit:

Reference junction temperature measurement is performed, for example, using a 1000Ω platinum resistance thermal detector (RTD) (61) (FIG. 6). In this example of operating the circuit, the ADC produces a constant current of 1 mA on IOUT1 (67); the current goes through a voltage divider circuit (62) that consists of: a platinum RTD (61) with a nominal (0° C.) resistance of 1 kΩ and a linear temperature response and fixed and variable resistors (63,64) that are used to balance the divider at 0° C.; ADC input 1 measures the voltage drop (65) across the platinum RTD (61); the ADC REFIN (66) measures the voltage drop across the balance resistors; the resistors (63,64) in the circuit are selected so that the ADC directly measures R/R0; and the reference junction temperature is determined using characteristics of the RTD (61).

The circuit is designed to perform open thermocouple detection using the 1 mA current analog output on the analog to digital converter IOUT1. If the thermocouple is open, then this will cause VDD to be read at the input of the instrumentation amplifier. If the thermocouple is intact, then the 1 MΩ and 4.7 kΩ resistors act as a voltage divider, and an appropriate voltage is read at the input of the instrumentation amplifier.

Specific embodiments of the invention have been used for illustrative purposes. The invention is not intended to be limited to the specific embodiments described herein. Modifications may be made to the described embodiments without departing from the invention. Specific values for voltages, resistances, currents, and frequencies are provided in the examples but the invention is not limited to the specific values in the examples.

The invention claimed is:

1. An apparatus for simultaneously determining temperatures at multiple locations, said apparatus comprising:
  a) a plurality of thermocouple sensors, each comprising a thermocouple circuit comprising a measurement junction and a reference junction;
  b) means for measuring a reference junction temperature;
  c) a Smart Transducer Interface Module (STIM) comprising a STIM processor in electrical communication with the plurality of thermocouple circuits and said means for measuring a reference junction temperature;
  d) a Network Capable Application Processor (NCAP) in electrical communication with the STIM; and
  e) a server in electrical communication with the NCAP wherein:
    the plurality of thermocouple circuits share a common reference junction and the means for measuring a reference junction temperature is configured to measure the temperature of the common reference junction;

the STIM is configured to receive analog data from the thermocouple sensors and said means for measuring reference junction temperatures, convert the analog data into processed digital data, and to transmit said processed data to the NCAP;

the NCAP is configured to receive processed data from the STIM, apply synchronized time stamps to and package and transmit the processed data received from the STIM to the server; and the server is configured to receive data from the NCAP, parse the data, and store the data.

2. The apparatus of claim 1, wherein 8 or more thermocouple sensors and one means for measuring reference junction temperatures send analog data to the STIM.

3. The apparatus of claim 1, comprising at least 4 thermocouple sensors and at least one means for measuring reference junction temperatures in communication with the STIM.

4. The apparatus of claim 1, wherein the thermocouple sensors in communication with the STIM are different types of thermocouple sensors.

5. The apparatus of claim 1, wherein said apparatus comprises more than one NCAP and each NCAP receives processed data from more than one STIM.

6. The apparatus of claim 1, wherein said means for measuring a reference junction temperature is select from the group consisting of a thermocouple, a thermister, a resistance temperature detector, a resistance thermal detector, and a direct temperature sensor.

7. The apparatus of claim 1, wherein said shared reference junction is in physical contact with a common substrate.

8. The apparatus of claim 1, wherein said plurality of thermocouple sensors comprises between 4 and 128 thermocouple sensors.

9. The apparatus of claim 1, wherein 4 or more measurement STIMs are in communication with the NCAP.

10. The apparatus of claim 9, wherein the STIMs and NCAP share common processing hardware and are integrated into a single unit.

* * * * *